US006862156B1

(12) United States Patent
Lin et al.

(10) Patent No.: US 6,862,156 B1
(45) Date of Patent: Mar. 1, 2005

(54) DISK DRIVE INCLUDING A DISK PLATE HAVING A DAMPING MEMBER

(75) Inventors: Chen-Chi Lin, San Jose, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 90 days.

(21) Appl. No.: 10/452,569

(22) Filed: May 30, 2003

(51) Int. Cl.$^7$ ................................................ G11B 33/08
(52) U.S. Cl. ............................... 360/97.02; 360/97.01; 360/97.03; 720/651
(58) Field of Search ........................... 360/97.01, 97.02, 360/97.03; 720/651

(56) References Cited

U.S. PATENT DOCUMENTS

| | | | | |
|---|---|---|---|---|
| 4,553,183 A | * | 11/1985 | Brown et al. ............ | 360/97.02 |
| 5,214,549 A | * | 5/1993 | Baker et al. ............. | 360/97.02 |
| 5,235,482 A | * | 8/1993 | Schmitz .................... | 360/97.02 |
| 5,282,100 A | * | 1/1994 | Tacklind et al. .......... | 360/97.02 |
| 5,483,397 A | * | 1/1996 | Gifford et al. ........... | 360/97.01 |
| 5,587,588 A | * | 12/1996 | Kim ......................... | 360/97.02 |
| 5,725,931 A | * | 3/1998 | Landin et al. ............. | 428/134 |
| 5,757,580 A | * | 5/1998 | Andress et al. .......... | 360/97.02 |
| 5,761,184 A | * | 6/1998 | Dauber et al. ............ | 720/694 |
| 5,777,821 A | * | 7/1998 | Pottebaum ................ | 360/97.02 |
| 5,781,373 A | * | 7/1998 | Larson et al. ............ | 360/97.02 |
| 5,982,580 A | * | 11/1999 | Woldemar et al. ....... | 360/97.02 |
| 6,366,426 B1 | * | 4/2002 | Beatty et al. ............ | 360/97.02 |
| 6,674,608 B1 | * | 1/2004 | Bernett ..................... | 360/97.01 |
| 2002/0141108 A1 | * | 10/2002 | Daniel et al. ............ | 360/97.01 |

* cited by examiner

*Primary Examiner*—William J. Klimowicz
(74) *Attorney, Agent, or Firm*—Won Tae C. Kim, Esq.; Milad G. Shara, Esq.; Stetina Brunda Garred & Brucker

(57) ABSTRACT

A disk drive includes a disk drive base and a spindle motor including a spindle motor hub rotatably coupled to the disk drive base. The disk drive further includes a disk having a disk surface disposed about the spindle motor hub. The disk drive further includes a cover attached to the disk drive base with the spindle motor and the disk enclosed within the cover and the disk drive base. The disk drive further includes a disk plate. The disk plate includes a plate body coupled to the disk drive base between the disk and the cover. The plate body extends substantially along the disk surface. The disk plate further includes a damping member disposed upon the plate body. The damping member includes a stiffener layer and a damping layer formed between the stiffener layer and the plate body for mitigating vibration of the plate body.

16 Claims, 5 Drawing Sheets

DISK DRIVE INCLUDING A DISK PLATE HAVING A DAMPING MEMBER

BACKGROUND OF THE INVENTION

1. Field of the Invention

The present invention relates generally to disk drives, and in particular to a disk drive including a disk plate having a damping member.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The printed circuit board assembly includes a servo control system in the form of a disk controller for generating servo control signals. The head stack assembly includes at least one transducer head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. A coil support extends from one side of the actuator body. An actuator coil is supported by the coil support and is configured to interact with one or more permanent magnets to form a voice coil motor. One or more actuator arms extend from an opposite side of the actuator body. Each head gimbal assembly includes a transducer head, typically a magneto-resistive head, which is distally attached to each of the actuator arms. Each magnetic disk includes opposing disk surfaces. Data may be recorded along data annular regions on a single disk surface or both. As such, the head stack assembly may be pivoted such that each transducer head is disposed adjacent the various data annular regions from adjacent the outer diameter to the inner diameter of each disk.

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

A topic of concern has been to reduce the overall acoustic noise generated by the operation of the disk drive. This is especially the ca se in applications such as the consumer electronics market. One contributor to the acoustic noise generated by the operations of the disk drive is the spindle motor. The rotation of the spindle motor results in acoustic noise generated within the disk drive and transmitted externally through the cover. In addition, many contemporary disk drive designs employ a spindle motor having a fixed shaft. In a fixed shaft type of spindle motor, the shaft is typically attached to the cover via a suitable fastener such as a screw. In such an arrangement, the structural vibrations of such fixed shaft spindle motor are directly transmitted to the cover when the spindle motor rotates during operation of the disk drive. Such vibrations further contribute to the overall acoustic noise generated by the disk drive. Accordingly, there is a need in the art for an improved disk drive configuration in comparison to the prior art.

SUMMARY OF THE INVENTION

An aspect of the present invention can be regarded as a disk drive. The disk drive includes a disk drive base. The disk drive further includes a spindle motor including a spindle motor hub rotatably coupled to the disk drive base. The disk drive further includes a disk disposed about the spindle motor hub. The disk includes a disk surface. The disk drive further includes a cover attached to the disk drive base with the spindle motor and the disk enclosed within the cover and the disk drive base. The disk drive further includes a disk plate. The disk plate includes a plate body coupled to the disk drive base between the disk and the cover. The plate body extends substantially along the disk surface. The disk plate further includes a damping member disposed upon the plate body. The damping member includes a stiffener layer and a damping layer formed between the stiffener layer and the plate body for mitigating vibration of the plate body.

According to various embodiments, the disk may be a topmost disk and the disk surface may be disposed toward the cover. The damping member may be disposed adjacent the cover. The plate body may be formed of a metal material. The stiffener layer may be formed of a metal material. The damping layer may be formed of a viscoelastic material. The plate body may have a thickness of between 0.02 inches and 0.04 inches. The stiffener layer may have a thickness of between 0.02 inches and 0.025 inches. The damping layer may have a thickness of between 0.001 inches and 0.002 inches. The plate body and the stiffener layer may have a same thickness. The plate body may extend entirely along the disk surface. The spindle motor may include a fixed spindle motor shaft and the spindle motor shaft may be distally attached to the disk plate. The disk plate may include a fastener, and the fastener extends from the disk plate towards the spindle motor and is engaged with the spindle motor shaft. The plate body may include a main portion and a raised portion. The raised portion may be offset from the main portion in a direction away from the disk towards the cover. The disk drive may further include a rotary actuator rotatably coupled to the disk drive base adjacent the disk. The raised portion may be disposed adjacent the rotary actuator. The disk drive may further include a disk clamp attached to the spindle motor hub between the spindle motor hub and the cover. The raised portion is disposed adjacent the disk clamp. In another arrangement, the rotary actuator may include an actuator arm disposed adjacent the disk between the disk and the cover. The plate body may include a radial opening and the actuator arm may be disposed within the radial opening.

DESCRIPTION OF TILE PREFERRED EMBODIMENTS

Figure 1:
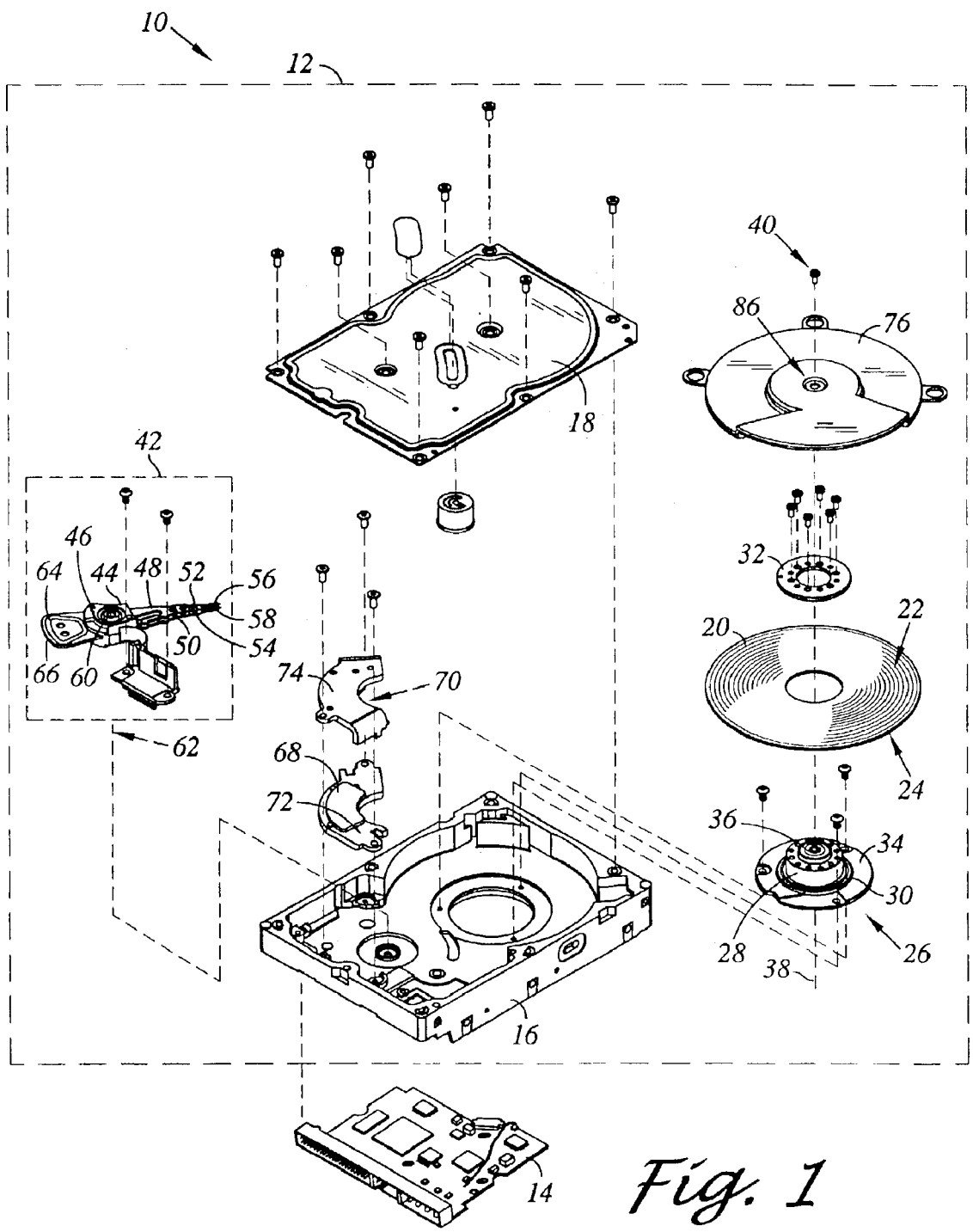
FIG. 1 is an exploded perspective view of a disk drive including a disk plate in accordance with an aspect of the present invention.

Referring now to the drawings wherein the showings are for purposes of illustrating preferred embodiments of the present invention only, and not for purposes of limiting the same, FIGS. 1–9 illustrate a disk drive and disk plate in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house at least one magnetic disk 20. The disk 20 contains a plurality of tracks for storing data. The tracks are disposed upon opposing first and second disk surfaces 22, 24 of the disk 20.

The head disk assembly 12 further includes a spindle motor 26 for rotating the disk 20. The spindle motor 26 includes a spindle motor hub 28 that is rotatably attached to the disk drive base 16. The spindle motor hub 28 has a hub body and a hub flange 30 that extends from the hub body for supporting the disk 20. Though not shown, additional disks may be utilized which are stacked upon the disk 20 and separated with annular disk spacers that are disposed about the hub body. A disk clamp 32 is attached about the spindle motor hub 28 and is utilized to apply a clamping force against the disk 20 for securing the disk 20 to the spindle motor hub 28. The spindle motor 26 includes a spindle motor base 34 that is attached to the disk drive base 16. The spindle motor 26 further includes a fixed shaft 36 that is coupled to a spindle motor base 34 and the spindle motor hub 28 surrounds the shaft 36. For structural stability, the shaft 36 may be distally attached to the cover 18 via a fastener 40 disposed through the cover 18 and axially received by the shaft 36 along an axis of rotation 38. The spindle motor 26 may be rotatably coupled to shaft 36 via a pair of bearing sets which may be of a bail bearing type. In another bearing configuration, a fluid type of bearing may be utilized. Though not shown, a stator is positioned about the shaft 36 and is attached to the spindle motor base 34. A magnet element is attached at a bottom portion of the hub flange 30. The stator includes windings that selectively conduct current to create a magnetic field that interacts with the various poles of the magnet element. Such interaction results in forces applied to the spindle motor hub 28 that tend to rotate the spindle motor hub 28 and the attached disk 20.

The head disk assembly 12 further includes a head stack assembly 42 rotatably attached to the disk drive base 16 in operable communication with the disk 20. The head stack assembly 42 includes a rotary actuator 44. The actuator 44 includes an actuator body 46 and actuator arms 48, 50 that extend from the actuator body 46. Distally attached to the actuator arms 48, 50 are suspension assemblies 52, 54. The suspension assemblies 52, 54 respectively support sliders 56, 58. Each of the sliders 56, 58 includes a transducer head. The suspension assemblies 52, 54 with the sliders 56, 58 are referred to as head gimbal assemblies. It is contemplated that the number of actuator arms and suspension assemblies may vary depending upon the number of disks and disk surfaces utilized.

The actuator body 46 includes a bore, and the actuator 44 further includes a pivot bearing cartridge 60 engaged within the bore for facilitating the actuator body 46 to rotate between limited positions about an axis of rotation 62. The actuator 44 further includes a coil support 64 that extends from one side of the actuator body 46 opposite the actuator arms 48, 50. The coil support 64 is configured to support a coil 66.

A pair of magnetic elements 68, 70 is supported by mounts 72, 74 which are attached to the disk drive base 16 (magnetic element 70 is indicated by the dashed lead line and it is understood the magnetic element 70 is disposed underneath the mount 74). The coil 64 interacts with the magnetic elements 68, 70 to form a voice coil motor for controllably rotating the actuator 44.

An aspect of the present invention can be regarded as the disk drive 10. The disk drive 10 includes the disk drive base 16. The disk drive 10 further includes the spindle motor 26 including the spindle motor hub 28 rotatably coupled to the disk drive base 16. The disk drive 10 further includes the disk 20 disposed about the spindle motor hub 28. The disk 20 includes a disk surface, such as disk surface 22. The disk drive 10 further includes a cover 18 attached to the disk drive base 16 with the spindle motor 26 and the disk 20 enclosed within the cover 18 and the disk drive base 16. The disk drive 10 further includes a disk plate 76.

Figure 2:
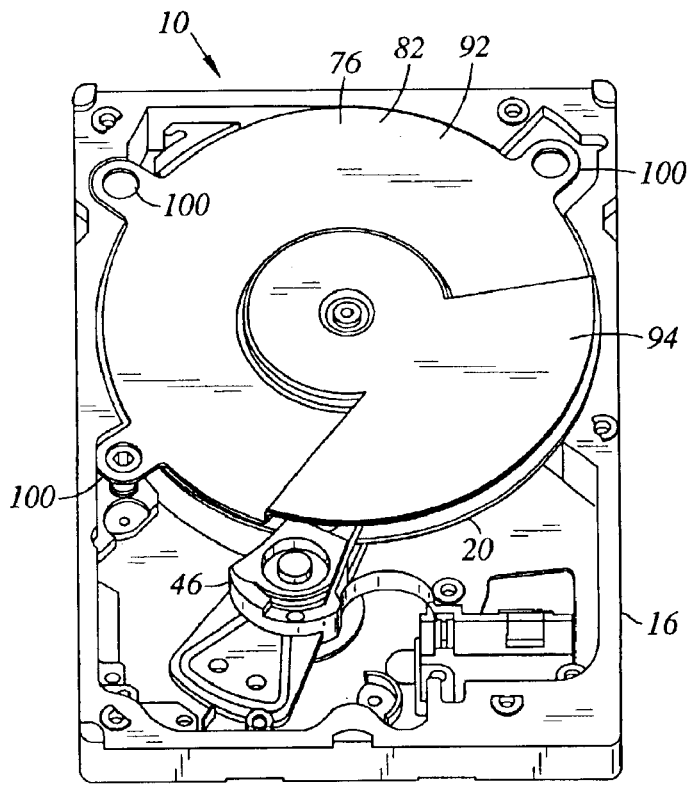
FIG. 2 is a perspective view of disk drive of FIG. 1 as assembled without a cover.
Figure 3:
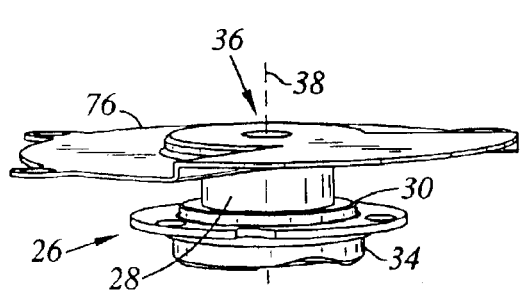
FIG. 3 is a perspective view of a spindle motor and the disk plate of FIG. 1 as shown in relation to each other.
Figure 4:
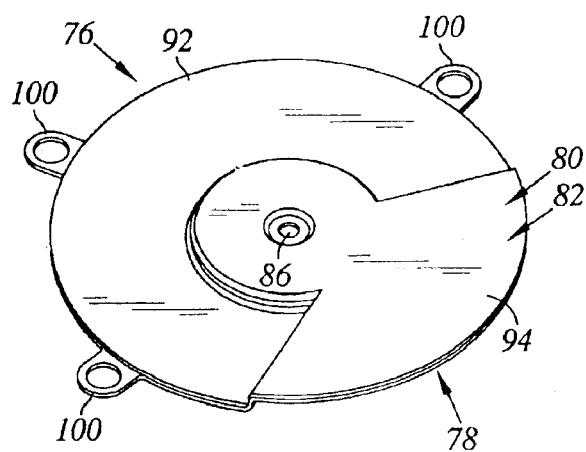
FIG. 4 is a perspective view of the disk plate.
Figure 5:
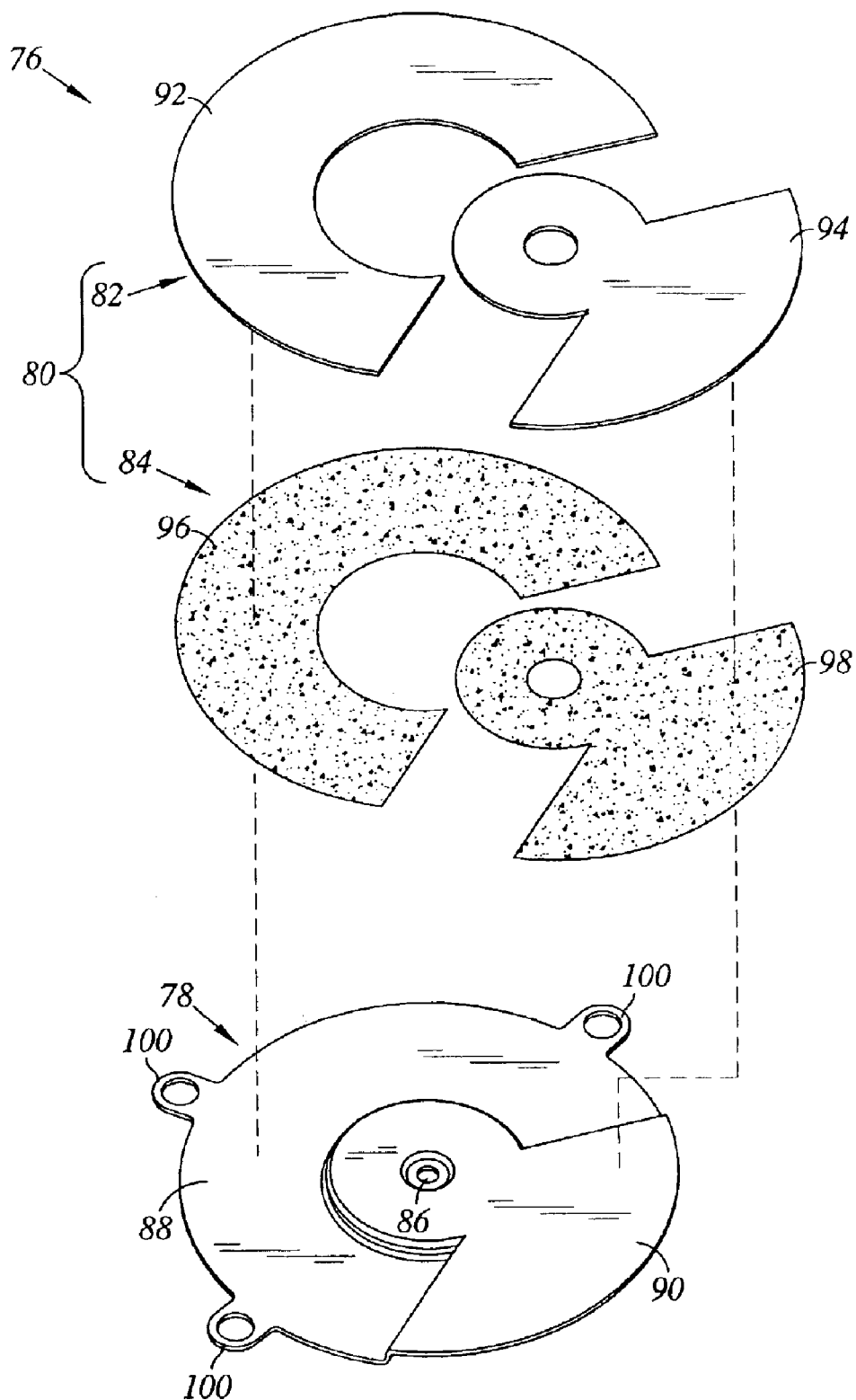
FIG. 5 is an exploded view of the disk plate of FIG. 4 as shown including a stiffening layer and a damping layer.

Referring additionally to FIG. 2 there is depicted a perspective view of the disk drive 10 of FIG. 1 as assembled as shown without the cover 18. FIG. 3 is a perspective view of the spindle motor 26 and the disk plate 76 of FIG. 1 as shown in relation to each other. FIG. 4 is a perspective view of the disk plate 76 and FIG. 5 is an exploded view of the disk plate 76 of FIG. 4. The disk plate 76 includes a plate body 78 as best seen in the exploded view of FIG. 5. The plate body 78 is coupled to the disk drive base 16 between the disk 20 and the cover 18. The plate body 78 extends substantially along the disk surface 22. The disk plate 76 further includes a damping member 80 disposed upon the plate body 76 as best seen in the exploded view of FIG. 5. The damping member 80 includes a stiffener layer 82 and a damping layer 84 formed between the stiffener layer 82 and the plate body 76 for mitigating vibration of the plate body 76.

It is contemplated that the utilization of the damping member 80 disposed upon the plate body 78 forms a constrained layer damper. The disk plate 76 is exposed to vibrations emanating from components within the disk drive 10, especially the spindle motor 26. The vibrations result in deflection of the plate body 78 and the stiffener layer 82 with a relative shear motion between the plate body 78 and the stiffener layer 82. The associated energy may be then dissipated by the damping layer 84. In this respect, the disk plate 76 may act as an acoustic buffer for the cover 18 in relation to the other disk drive components.

The plate body 78 and the stiffener layer 82 may be formed of a metal material, such as stainless steel. The plate body 78 may have a thickness of between 0.02 inches and 0.04 inches. The stiffener layer 82 may have a thickness of between 0.02 inches and 0.025 inches. In this regard, the plate body 76 and the stiffener layer 82 may have a same thickness. The damping layer 84 may be formed of a viscoelastic material. The damping layer 84 may have a thickness of between 0.001 inches and 0.002 inches.

According to various embodiments, the disk 20 may be a topmost disk and the disk surface 22 may be disposed toward the cover 18. The plate body 78 may extend entirely along the disk surface 22. The damping member upon the disk plate 76 may be disposed adjacent the cover 18. The spindle motor 26 may include the fixed spindle motor shaft 36 and the spindle motor shaft 36 may be distally attached to the disk plate 76. The disk plate 76 may include the fastener 40. The fastener 40 may extend from the disk plate 76 towards the spindle motor 26 and may be engaged with the spindle motor shaft 36. In this regard, the disk plate 76 may include a fastener opening 86. The fastener 40 extends through the cover 18 and the fastener opening 86 of the disk plate 78. It is contemplated that structural vibrations directly transmitted from the spindle motor 26 to the disk plate 76 may be mitigated through the utilization of the damping member 80.

The plate body 76 may include a main portion 88 and a raised portion 90. The raised portion 90 may be offset from the main portion 88 in a direction away from the disk 20 towards the cover 18. The disk drive 10 may further include the rotary actuator 44 rotatably coupled to the disk drive base 16 adjacent the disk 20. The raised portion 90 may be disposed adjacent the rotary actuator 44. The disk drive 10 may further include the disk clamp 32 attached to the spindle motor hub 28 between the spindle motor hub 28 and the cover 18. The raised portion 90 is disposed adjacent the disk clamp 32.

The stiffener layer 82 may include first and second sections 92, 94. The first section 92 is disposed adjacent the main portion 88 of the plate body 78. The second section 94 is disposed adjacent the raised portion 90 of the plate body 78. Similarly the damping layer 84 may include first and second sections 96, 98. The first section 96 is disposed between the first section 92 of the stiffener layer 82 and the main portion 88 of the plate body 78. The second section 98 is disposed between the second section 94 of the stiffener layer 82 and the main portion 88 of the plate body 78.

The stiffener layer 82 may be manufactured in sheet form with the material utilized to form the damping layer 84 being applied on the stiffener layer 82. The damping member 80 may have a variety of geometric configurations. It is contemplated that the higher degree of coverage of the disk plate 78 is preferable for enhancing the damping effect.

The disk plate 78 may include fastener openings 100 for allowing attachment of the disk plate to the disk drive base 16. Though not shown, it is contemplated that stiffener layer 82 may have similarly configured openings for more directly coupling the stiffener layer 82 to the disk drive base 16.

Figure 6:
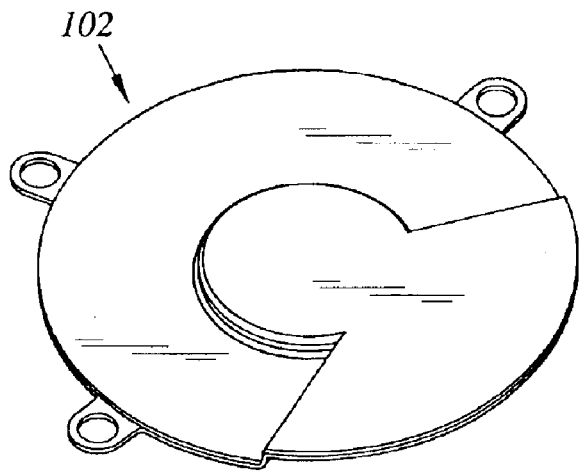
FIG. 6 is a perspective view similar to that of FIG. 4 however of a disk plate according to another embodiment.
Figure 7:
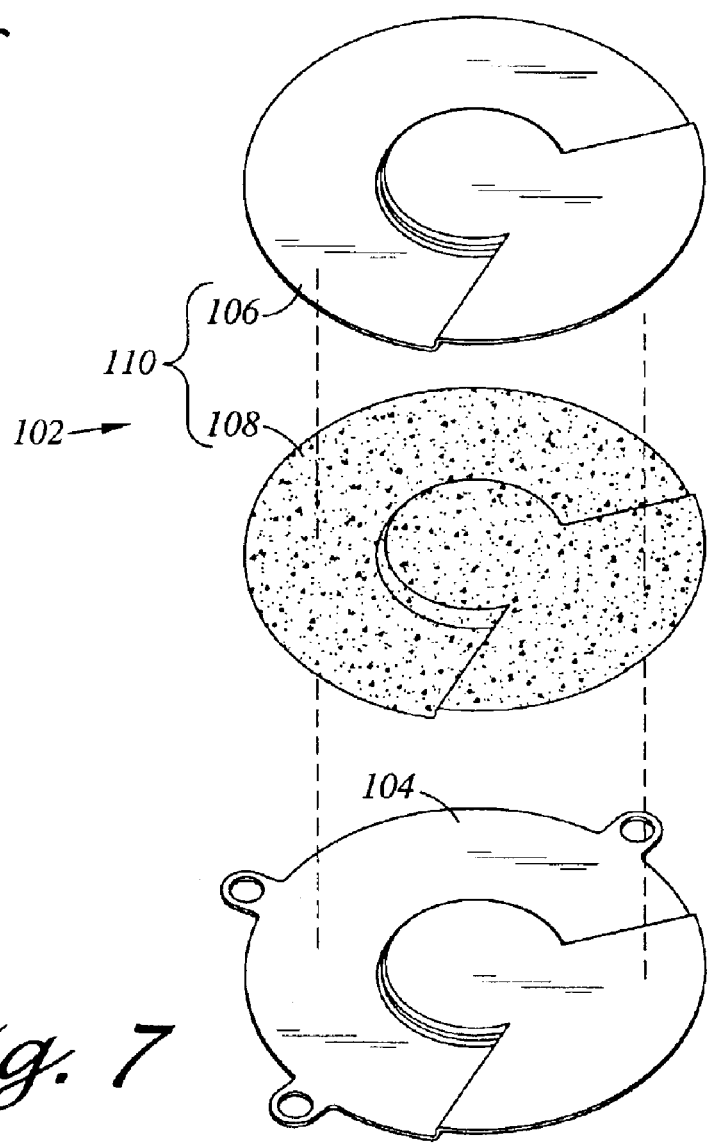
FIG. 7 is an exploded view of the disk plate of FIG. 6 as shown including a damping member with a stiffening layer and a damping layer.

Referring now to FIG. 6 there is depicted a disk plate 102 according to another embodiment. Except as noted, the disk plate 102 is similarly configured as disk plate 76. Unlike disk plate 76 which includes the fastener opening 86, disk plate 102 does not include any such opening. It is contemplated that disk plate 102 would be utilized in a disk drive which does not require that the spindle motor shaft be coupled to the cover, such as how the shaft 36 is coupled to the cover 18. In this regard, the disk plate 102 includes a plate body 104 which does not include any central opening. The disk plate 102 includes a damping member 110 with a stiffener layer 106 and a damping layer 108 which is similarly configured as damping member 80, however, with the stiffener layer 106 and the damping layer 108 each being formed of a single piece of material.

In the manufacturing of the stiffener layer 106, the stiffener layer 106 may be initially cut from a sheet of metal. Subsequently, it may be stamped to form the various features such as the offset associated with that portion which is disposed adjacent to the rotary actuator 44. Next, the material utilized to form the damping layer 108 may be applied to the stiffener layer 106 and then the entire damping member 110 may be applied to the plate body 104. In another manufacturing process, the plate body 104 and the stiffener layer 106 may be initially cut from a sheet of material. The material utilized to form the damping layer 108 may be applied to either of the plate body 104 of the stiffener layer 106. Next, the plate body 104, the damping layer 108 and the stiffener layer 106 may be sandwiched. The entire stack may then undergo a stamping process for form the desired features such as the offset associated with that portion which is disposed adjacent the rotary actuator 44.

Figure 8:
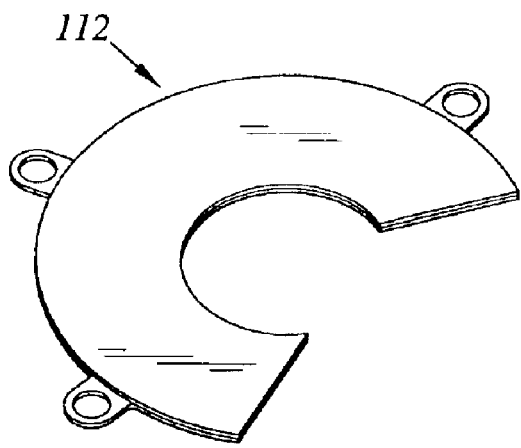
FIG. 8 is a perspective view similar to that of FIG. 4 however of a disk plate according to another embodiment.
Figure 9:
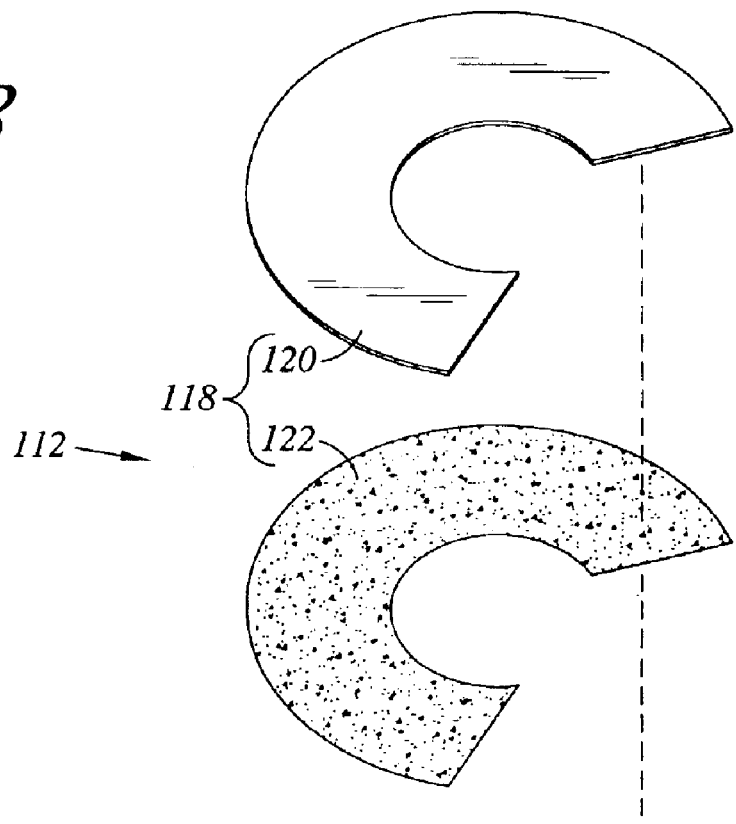
FIG. 9 is an exploded view of the disk plate of FIG. 8 as shown including a damping member with a stiffening layer and a damping layer.
Figure 9:
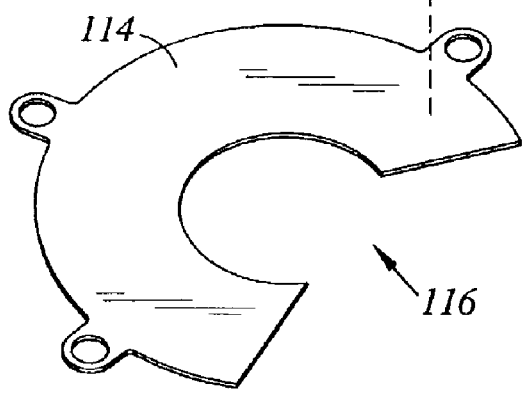

Referring now to FIG. 8 there is depicted a disk plate 112 according to another embodiment. The disk plate 112 is similarly configured to the disk plate 76 except with the differences noted. The disk plate 112 includes a plate body 114. The plate body 114 is configured similar to the main portion 88 of the plate body 78. In this regard, the plate body 114 does not include any structure corresponding to the raised portion 90 of the plate body 78. Rather, the plate body 114 includes a radial opening 116 and the actuator arm 48 of the actuator 44 may be disposed within the radial opening 116. While the disk plate 112 is not contemplated to be significant acoustic barrier for insulating the cover 18 from exposure to vibration, the disk plate 112 may disposed adjacent the disk surface 22 sufficiently close so as to impact disk rotation induced airflow dynamics. It is contemplated that the utilization of the disk plate 112 may mitigate effects of disk rotation induced airflow upon the actuator arm 48. The disk plate 112 includes a damping member 118 with a stiffener layer 120 and a damping layer 122 which is similarly configured as damping member 80. In this regard, the damping member 118 in this application is primarily utilized to mitigate vibrations of the disk plate 112 itself. This may be of concern where such vibrations of the disk plate 112 result from shock events for example.

We claim:

1. A disk drive comprising:
    a disk drive base;
    a spindle motor including a spindle motor hub rotatably coupled to the disk drive base;
    a disk disposed about the spindle motor hub, the disk including a disk surface;
    a cover attached to the disk drive base with the spindle motor and the disk enclosed within the cover and the disk drive base; and
    a disk plate including:
        a plate body coupled to the disk drive base between the disk and the cover, the plate body extends substantially along the disk surface; and a damping member disposed upon the plate body, the
damping member including:
a stiffener layer; and
a damping layer formed between the stiffener layer and the plate body for mitigating vibration of the plate body.

2. The disk drive of claim 1 wherein the disk is a topmost disk, the disk surface is disposed towards the cover, the damping member is disposed adjacent the cover.

3. The disk drive of claim 1 wherein the plate body is formed of a metal material.

4. The disk drive of claim 1 wherein the stiffener layer is formed of a metal material.

5. The disk drive of claim 1 wherein the damping layer is formed of a viscoelastic material.

6. The disk drive of claim 1 wherein the plate body has a thickness of between 0.02 inches and 0.04 inches.

7. The disk drive of claim 1 wherein the stiffener layer has a thickness of between 0.02 inches and 0.025 inches.

8. The disk drive of claim 1 wherein the damping layer has a thickness of between 0.001 inches and 0.002 inches.

9. The disk drive of claim 1 wherein the plate body and the stiffener layer have a same thickness.

10. The disk drive of claim 1 wherein the plate body extends entirely along the disk surface.

11. The disk drive of claim 1 wherein the spindle motor includes a fixed spindle motor shaft, the spindle motor shaft is distally attached to the disk plate.

12. The disk drive of claim 1 wherein the disk plate includes a fastener, the fastener extends from the disk plate towards the spindle motor and is engaged with the spindle motor shaft.

13. The disk drive of claim 1 wherein the plate body includes a main portion and a raised portion, the raised portion is offset from the main portion in a direction away from the disk towards the cover.

14. The disk drive of claim 13 further includes a rotary actuator rotatably coupled to the disk drive base adjacent the disk, the raised portion is disposed adjacent the rotary actuator.

15. The disk drive of claim 13 further includes a disk clamp attached to the spindle motor hub between the spindle motor hub and the cover, the raised portion is disposed adjacent the disk clamp.

16. The disk drive of claim 1 further includes a rotary actuator rotatably coupled to the disk drive base adjacent the disk, the rotary actuator includes an actuator arm disposed adjacent the disk between the disk and the cover, the plate body includes a radial opening, the actuator arm is disposed within the radial opening.

* * * * *